US012591387B1

(12) United States Patent　　(10) Patent No.:　US 12,591,387 B1
Thomas et al.　　　　　　　　　　(45) Date of Patent:　　Mar. 31, 2026

(54) PLACEMENTS OF DATA PATH SERVICE PARTITIONS

(71) Applicant: HEWLETT PACKARD ENTERPRISE DEVELOPMENT LP, Spring, TX (US)

(72) Inventors: Deepak Thomas, Apex, NC (US); Ricardo Labiaga, San Jose, CA (US); Luan Anh Hong, Durham, NC (US); Tao Jin, Durham, NC (US); Haewon Lee, Durham, NC (US); Rajesh Subbiah, Durham, NC (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 0 days.

(21) Appl. No.: 18/903,031

(22) Filed: Oct. 1, 2024

(51) Int. Cl.
　　　*G06F 3/06*　　　　　(2006.01)
(52) U.S. Cl.
　　　CPC ............ *G06F 3/0655* (2013.01); *G06F 3/061* (2013.01); *G06F 3/0679* (2013.01)
(58) Field of Classification Search
　　　CPC ..... G06F 3/0631; G06F 3/0655; G06F 3/0679
　　　See application file for complete search history.

(56) References Cited

U.S. PATENT DOCUMENTS

| 10,484,301 | B1 * | 11/2019 | Shukla | ................... | G06F 3/0605 |
| 2012/0311295 | A1 * | 12/2012 | Gaur | ..................... | G06F 3/0631 |
| | | | | | 711/E12.001 |
| 2016/0188426 | A1 * | 6/2016 | Kousha | ................. | G06F 16/256 |
| | | | | | 714/4.12 |
| 2020/0034245 | A1 * | 1/2020 | Kohler | ................ | G06F 11/1458 |
| 2020/0073559 | A1 * | 3/2020 | Kirkpatrick | ............. | G06F 3/064 |
| 2023/0121626 | A1 * | 4/2023 | Vu | ........................ | G06F 3/0644 |
| | | | | | 711/173 |

OTHER PUBLICATIONS

Go.dev, "leader," package Documentation, retrieved Apr. 4, 2024 <https://pkg.go.dev/github.com/operator-framework/operator-lib/leader>. 4 pages.
GRPC, Introduction to gRPC downloaded Sep. 17, 2024 (2 pages).
Kubernetes, ConfigMaps downloaded Sep. 18, 2024 (7 pages).
Kubernetes, kubelet downloaded Sep. 17, 2024 (16 pages).

(Continued)

*Primary Examiner* — Zachary K Huson
(74) *Attorney, Agent, or Firm* — Trop, Pruner & Hu, P.C.

(57) ABSTRACT

In some examples, a scheduler of a control plane schedules control plane entities in a cluster of computing nodes, where placements of the control plane entities in respective computing nodes reflect where respective data path service partitions are to be placed. A first control plane entity in a first computing node activates a first data path service partition in the first computing node. The first data path service partition is used to access data of a first data shard in a data store, where data of the data store is partitioned across a plurality of data shards associated with the respective data path service partitions. Based on a condition of the cluster of computing nodes, a placement of a second control plane entity is modified to change a placement in the cluster of computing nodes of a second data path service partition associated with the second control plane entity.

20 Claims, 6 Drawing Sheets

(56) References Cited

OTHER PUBLICATIONS

Kubernetes, Kubernetes Scheduler downloaded Sep. 18, 2024 (2 pages).
The Kubernetes Authors, "Pods," retrieved Apr. 4, 2024, <https://kubernetes.io/docs/concepts/workloads/pods/_print/>, 41 pages.
The Kubernetes Authors, "Scheduling, Preemption and Eviction," Kubernetes Documentation, retrieved Sep. 30, 2024, <https://kubernetes.io/docs/concepts/scheduling-eviction/_print/>. 01 pages.
Wikipedia, NVM Express downloaded Sep. 17, 2024 (15 pages).

* cited by examiner

300

Storage Medium

302

Control Plane Entities Scheduling Instructions

304

First Control Plane Entity Activation Instructions

306

Data Shard Access Instructions

308

Control Plane Entity Placement Modification Instructions

500 ⌐

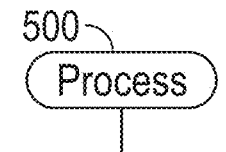

Process

502 ⌐

Schedule, using a scheduler of a control plane, control plane entities in respective computing nodes of the cluster of computing nodes, where the control plane entities are part of the control plane, and placements of the control plane entities in the respective computing nodes reflect where respective data path service partitions are to be placed, the respective data path service partitions being part of a data plane to access corresponding data shards in a data store

504 ⌐

Activate, by a first control plane entity of the control plane entities in a first computing node of the cluster of computing nodes, a first data path service partition in the first computing node

506 ⌐

Access, using the first data path service partition in the first computing node, data of a first data shard in the data store, where data of the data store is partitioned across a plurality of data shards associated with the respective data path service partitions

508 ⌐

Modify, based on a changed condition of the cluster of computing nodes, a placement of the first control plane entity to evict the first control plane entity from the first computing node and place the first control plane entity in a second computing node of the cluster of computing nodes

FIG. 5

PLACEMENTS OF DATA PATH SERVICE PARTITIONS

BACKGROUND

A data store includes a pool of storage devices used to store data. In some examples, the storage devices can include flash memory devices that are arranged in groups of just a bunch of flash (JBOF). In other examples, the storage devices can include disk-based storage devices or other types of storage devices.

BRIEF DESCRIPTION OF THE DRAWINGS

Some implementations of the present disclosure are described with respect to the following figures.

FIG. 5 is a flow diagram of a process according to some examples.

Figure 1:
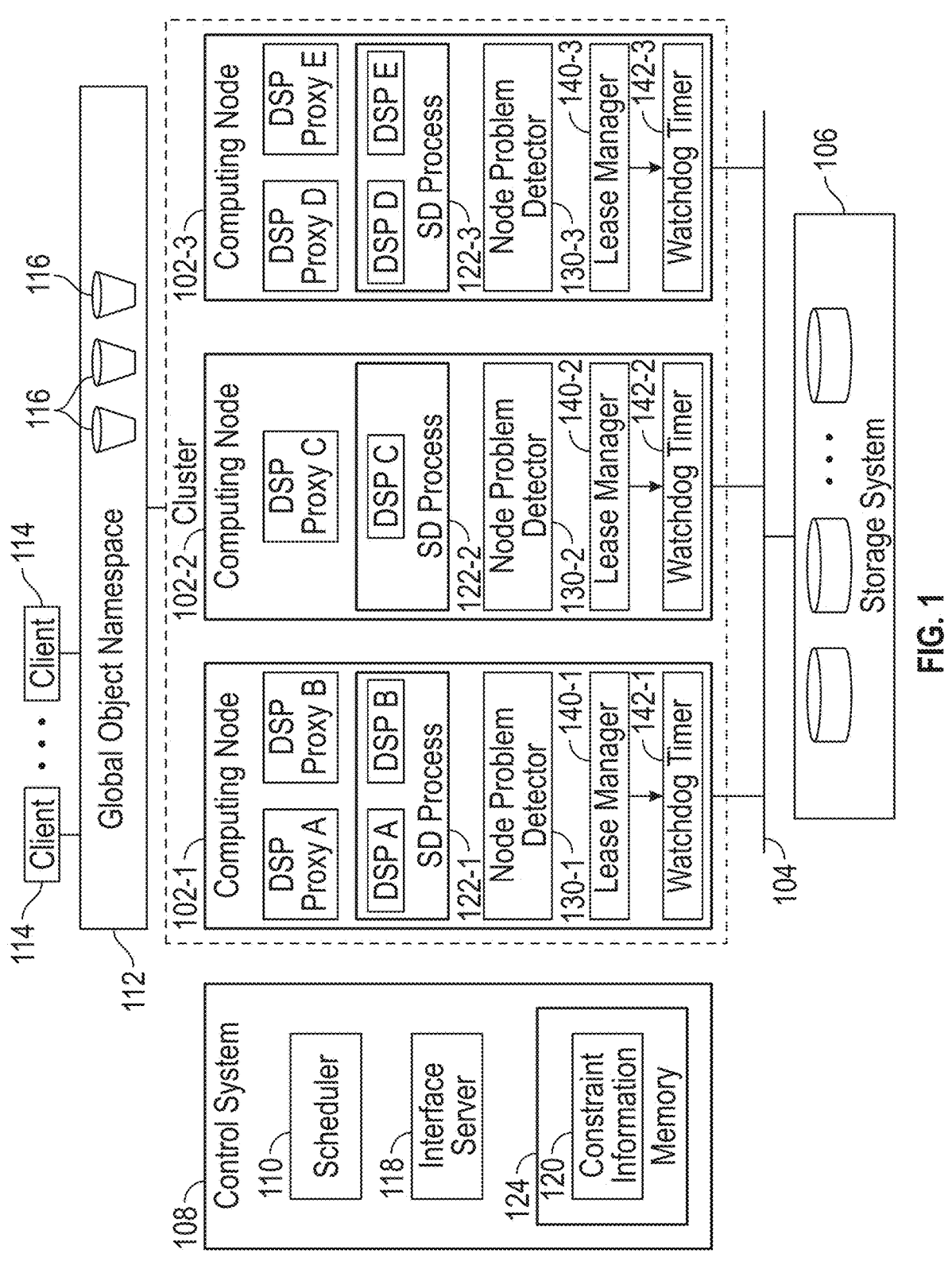
FIG. 1 is a block diagram of an arrangement including a cluster of computing nodes, a control system, and a storage system, according to some examples.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

Distributed data partitioning can be applied to data in a data store to create data shards, where a "data shard" can refer to a partition or segment of the data in the data store. A cluster of computing nodes can be deployed to allow for distributed access of the data shards in the data store. Each computing node can execute one or more data path service partitions, where each data path service partition supports input/output (I/O) access of a respective data shard. Multiple data path service partitions can access respective data shards in parallel.

Decisions of how to allocate data path service partitions to computing nodes can be a complex. The allocation of data path service partitions across a cluster of computing nodes can include an initial scheduling of the data path service partitions in selected computing nodes. Following the initial scheduling, placements of the data path service partitions across computing nodes can be modified as conditions change in the cluster of computing nodes. Changing conditions can include failures or faults in a computing node, loss of connectivity of a computing node to the data store, an unbalanced workload distribution in which one computing node may execute more workloads than another computing node, additions or removals of computing nodes, or any other factor that can influence how well workloads perform in the cluster of computing nodes.

Other issues associated with using a cluster of computing nodes for distributed access of data shards in the data store may include any or some combination of the following: the potential for data corruption associated with multiple instances of a data path service partition accessing the same data shard, placement of data path service partitions in unhealthy computing nodes, determining when to disable computing nodes, excessive failover times when transitioning workloads from an unhealthy computing node to another computing node, or further issues.

In accordance with some implementations of the present disclosure, rather than directly placing data path service partitions on computing nodes, a scheduler of a control plane for a cluster of computing nodes associated with a data store can schedule proxies of the data path service partitions in respective computing nodes. A proxy is a control entity that is responsible for activating and deactivating a respective data path service partition in the computing node. The proxy (referred to as a "data partition proxy") is part of the control plane, while a data path service partition activated or deactivated by the data partition proxy is part of a data plane.

In some examples, each data partition proxy is executed in a container, which is a virtual compute entity. In specific examples, the data partition proxy is executed in a container of a Kubernetes pod. In other examples, a data partition proxy can execute in a virtual machine (VM). In further examples, a data partition proxy can include a program. By placing data partition proxies in respective computing nodes, the scheduler would not have to be configured to support data path service partitions. Instead, the scheduler schedules data partition proxies in selected computing nodes, where the placement of the data partition proxies according to the scheduling reflects where respective data path service partitions are to be placed. Stated another way, the scheduler indirectly places data path service partitions in computing nodes based on placing data partition proxies in the computing nodes.

A "computing node" can refer to a physical computer or multiple physical computers. A "data path service partition" refers to any collection of modules and data structures that is used to access a data shard in response to a request (e.g., a read request or a write request) from a requester. Examples of modules that may be included in a data path service partition include any or some combination of the following: a caching module that manages caching of data (e.g., caching write data in a write buffer), an indexing module that manages indexing of data, or a garbage collector that manages removal of data from a storage system after a delete operation to delete the data. Examples of data structures that may be included in a data path service partition include any or some combination of the following: a write buffer to cache write data to be written to the storage system, an index that maps objects to storage locations in the storage system, or redundancy information relating to data redundancy in the storage system, such as Redundant Array of Independent Disks (RAID) redundancy. Although example modules and data structures are listed above, in further examples, a data path service partition can include additional or alternative modules or data structures.

In some examples, a data path service partition forms a vertical slice of an I/O stack for a storage system. Multiple data path service partitions thus form multiple vertical slices of the I/O stack that can independently access respective data shards in parallel. An I/O stack includes the modules and data structures involved in data access operations of a corresponding data shard. A vertical slice of the I/O stack refers to a respective instance of the modules and data structures for the corresponding data shard.

FIG. 1 is a block diagram of an example arrangement that includes a cluster of computing nodes 102-1, 102-2, and 102-3. Although three computing nodes are shown in FIG. 1, in a different example, a cluster can include a different quantity of computing nodes.

The computing nodes 102-1 to 102-3 communicate over an interconnect 104 to a storage system 106. In some examples, the storage system 106 includes an arrangement of storage devices, such as flash memory devices, disk-based storage devices, or other types of storage devices. An "interconnect" can refer to a communication medium over which data is communicated. Examples of the interconnect 104 can include any or some combination of the following: a local area network (LAN), a storage area network (SAN), a wide area network (WAN), or any other type of communication link.

In some examples, data communications over the interconnect 104 are according to a protocol, such as the Nonvolatile Memory Express (NVMe)-over-Fabric (NVMEoF) protocol, the Internet Small Computer Systems Interface (ISCSI) protocol, the Infiniband protocol, or any other protocol, whether standardized, open source, or proprietary.

A control system 108 is associated with the cluster of computing nodes 102-1 to 102-3. The control system 108 can be implemented using one or more computers. In some cases, the elements of the control system 108 can be implemented in one or more of the computing nodes 102-1 to 102-3. In other examples, the control system 108 can be separate from the computing nodes 102-1 to 102-3.

The control system 108 includes a scheduler 110 to perform scheduling of data partition proxies in the computing nodes 102-1 to 102-3, which controls where data path service partitions are placed. Although referred to as a singular entity, the scheduler 110 can include multiple modules. For example, if the control system 108 is a Kubernetes control system, then the scheduler 110 can include the following modules: a Kubernetes scheduler, a Kubernetes descheduler, and a mapper. Generally, a Kubernetes scheduler is responsible for placing pods in computing nodes, where a pod can include one or more containers. The Kubernetes scheduler places pods in computing nodes based on a pod specification (which includes constraints guiding how the Kubernetes scheduler is to place the pods). A Kubernetes descheduler complements actions of the Kubernetes scheduler by rebalancing pods across the computing nodes in response to specific events, such as failures of computing nodes. Moreover, the descheduler can check (e.g., periodically) current pod placements and can verify that the pod placements satisfy constraints specified by the pod specification. If pod placements do not satisfy the constraints, the descheduler can create an eviction plan to evict pods from a computing node, and the descheduler can send information regarding the evicted pods to the Kubernetes scheduler to schedule the evicted pods. The mapper provisions pods during cluster setup or cluster change (e.g., addition of a computing node or removal of a computing node).

In other examples, the scheduler 110 can be implemented using a different technology. Generally, the scheduler 110 can be implemented using machine-readable instructions executable on a processing resource of the control system 108.

The control system 108 further includes an interface server 118 with which components in the computing nodes 102-1 to 102-3 can communicate. In some examples, the interface server 118 includes an application programming interface (API) server, which presents an API accessible by the components in the computing nodes 102-1 to 102-3. Communications can be achieved between the components in the computing nodes 102-1 to 102-3 and the control system 108 using routines of the API. In other examples, the interface server 118 may present a different type of interface for access by the components in the computing nodes 102-1 to 102-3.

In some examples, data can be stored as blocks in the storage devices of the storage system 106. A "block" can refer to a chunk or any other data portion. The chunks are stored in respective storage locations of the storage system 106. Although data is stored as chunks in the storage system 106, clients 114 can access objects, where an object includes an arrangement of chunks stored in the storage system 106. For example, an object can be part of an object store, e.g., such as an object store provided by the Amazon Simple Storage Service (S3). An S3 object store stores data as objects. In the example of FIG. 1, a global object namespace 112 is presented to the clients 114. The global object namespace includes names of objects accessible by the clients 114. A "client" can refer to an electronic device or a program.

In examples where an S3 object store is used, objects can be contained in buckets 116. A bucket 116 can include one or more objects. The objects of each bucket 116 can be divided into data shards that are accessible by data path service partitions in the computing nodes 102-1, 102-2, and 102-3.

In other examples, other types of object stores can be used to store data accessible by the clients 114. For example, another type of object store can store files, and the global object namespace 112 in this case can be replaced with a filesystem. Regardless of the type of object store used, data for objects of the object store is partitioned across the computing nodes 102-1 to 102-3 into data shards accessible by respective data path service partitions.

Each data path service partition is represented as "DSP" in FIG. 1. In the example of FIG. 1, two data path service partitions (DSP A and DSP B) are deployed in the computing node 102-1, one data path service partition (DSP C) is deployed in the computing node 102-2, and two data path service partitions (DSP D and DSP E) are deployed in the computing node 102-3. Although specific quantities of DSPs are shown in each computing node, in other examples, a computing node can run a different quantity of DSPs.

The scheduler 110 places data partition proxies (represented as DSP proxies in FIG. 1) in respective computing nodes. In the example of FIG. 1, DSP Proxy A and DSP Proxy B are placed by the scheduler 110 in the computing node 102-1, DSP Proxy C is placed by the scheduler 110 in the computing node 102-2, and DSP Proxy D and DSP Proxy E are placed by the scheduler 110 in the computing node 102-3.

A DSP proxy is part of the control plane, while a data path service partition (DSP) is part of the data plane. The data plane defines the path that the data takes between the storage system 106 and a client that requests access (read or write) of the data. A control plane includes control functionalities that manage the data plane.

The scheduler 110 places DSP proxies in the computing nodes 102-1, 102-2, and 102-3 according to constraint information 120 stored in a memory 124 of the control system 108. The constraint information 120 includes one or more rules governing where DSP proxies are to be placed for achieving a target goal, such as to distribute DSPs evenly across the computing nodes 102-1 to 102-3, to avoid placing a DSP on a particular computing node, or any other rule.

In some examples, a DSP is associated with a services daemon (SD) process. The SD process may be a user space process that executes in the user space of a computing node for the purpose of invoking services, such as a DSP. In the example of FIG. 1, an SD process 122-1 is executed in computing node 102-1, an SD process 122-2 is executed in the computing node 102-2, and an SD process 122-3 is executed in the computing node 102-3.

In some examples, an SD process is containerized (to include one or more containers) and implements the data plane in a computing node. A DSP is run in a container of the SD process. In other examples, DSPs can be implemented as microservices managed by the SD process. In yet further examples, DSPs can be run in VMs.

In the example of FIG. 1, DSP A and DSP B are associated with the SD process 122-1 (e.g., DSP A and DSP are run in respective containers of the SD process 122-1), DSP C is associated with the SD process 122-2, and DSP D and DSP E are associated with the SD process 122-3.

Once a DSP proxy is placed in a computing node, the DSP proxy communicates with a respective SD process to activate a corresponding DSP in the computing node. For example, DSP proxy A instructs the SD process 122-1 to activate DSP A, and DSP proxy B instructs the SD process 122-1 to activate DSP B. Similarly, DSP proxy C instructs the SD process 122-2 to activate DSP C, DSP proxy D instructs the SD process 122-3 to activate DSP D, and DSP proxy E instructs the SD process 122-3 to activate DSP E. An activated DSP starts running in a computing node and uses resources (including processing, memory, and communication resources) of the computing node.

A DSP proxy can also communicate with an SD process to deactivate a DSP. Activating a DSP can refer to launching a DSP or signaling the DSP to start running. Deactivating a DSP can refer to closing a DSP or signaling the DSP to stop running. Communications between a DSP proxy and an SD process can be accomplished through a message interface, such as a remote procedure call (RPC) interface. An example of an RPC interface is a gRPC interface. Another message interface that can be used is a REpresentational State Transfer (REST) interface.

In some examples, an SD process is stateless; in other words, the SD process does not maintain persistent information about activated DSPs associated with the SD process. If the SD process restarts (goes down and starts again), DSP proxies in the same computing node detects the restart of the SD process, and can instruct the SD process to reactivate respective DSPs. In some examples, DSP proxies maintain persistent information about activated DSPs, so that the SD process can reactivate the DSPs upon restart of the SD process.

In other examples, an SD process is omitted. In such other examples, a DSP proxy is able to activate or deactivate DSPs directly without interacting with an SD process.

The scheduler 110 launches DSP proxies in respective computing nodes 102-1 to 102-3 during cluster setup or when a computing node is added. After cluster setup, the scheduler 110 may also add more DSP proxies on a computing node or remove DSP proxies from a computing node as conditions of the cluster of computing nodes 102-1 to 102-3 change. The scheduler 110 may also migrate a DSP proxy from one computing node to another computing node, such as to balance the load of the computing nodes 102-1 to 102-3, or more generally, when the scheduler 110 detects that a current placement of DSPs in the computing nodes 102-1 to 102-3 does not satisfy the rule(s) of the constraint information 120.

A DSP proxy is able to handle an error condition when attempting to activate or deactivate a DSP in a computing node. For example, the DSP proxy is able to self-terminate itself in a computing node if the SD process in the computing node returns an error (e.g., an out-of-resource error indicating that the SD process has detected that resources of the computing node have been exhausted). Self-terminating a DSP proxy includes the DSP proxy closing itself in the computing node and notifying the scheduler 110 so that the DSP proxy can be rescheduled by the scheduler 110 on another computing node. As part of the self-termination, the DSP proxy also deactivates the respective DSP.

In some examples, each computing node further includes a node problem detector, which may be implemented as machine-readable instructions. For example, the computing node 102-1 includes a node problem detector 130-1, the computing node 102-2 includes a node problem detector 130-2, and the computing node 102-3 includes a node problem detector 130-3. Each node problem detector is able to monitor conditions of a computing node to determine whether the computing node is unhealthy. For example, the node problem detector is able to detect whether the computing node has lost connectivity to the storage system 106, such as due to a hardware failure or software fault. In further examples, the node problem detector can detect whether certain programs are down or not functioning properly. For example, if the cluster of computing nodes forms a Kubernetes cluster, then the node problem detector may be able to detect whether a kubelet is running in a computing node. The kubelet is a node agent that checks to make sure that containers are running properly.

In other examples, the node problem detector is able to monitor various metrics, such as metrics relating to usage of resources (e.g., processing resources, memory resources, communication resources, etc.), metrics relating to performance of resources, error metrics, or other types of metrics. Based on the metrics, the node problem detector is able to detect or predict an unhealthy condition of the computing node. Generally, an "unhealthy" condition refers to a condition of a computing node in which the computing node is or will perform at less than a target level or is or will exhibit errors or faults.

A node problem detector can send a notification to the control system 108 (such as to the interface server 118) if the node problem detector detects an unhealthy computing node. The notification can be in the form of a message, a signal, an information element, or any other indicator specifying the unhealthy condition of a computing node. In response to the notification, the scheduler 110 can migrate DSP proxies from the unhealthy computing node to one or more target computing nodes.

In some examples, a computing node may additionally include a lease manager (e.g., implemented as machine-readable instructions) that manages a node lease of the computing node. In FIG. 1, the computing node 102-1 includes a lease manager 140-1, the computing node 102-2 includes a lease manager 140-2, and the computing node 102-3 includes a lease manager 140-3. A "node lease" refers to a health indicator for indicating whether the computing node is functioning properly. As long as the computing node is functional and in communication with other computing nodes of the cluster (i.e., the computing node is not isolated from the cluster), the lease manager maintains the node lease and continues to refresh the watchdog timer A watchdog timer 142-1 is in the computing node 102-1, a watchdog timer 142-2 is in the computing node 102-2, and a watchdog timer 142-3 is in the computing node 102-3. In some examples, a watchdog timer is a hardware timer that runs for a specified count, after which the watchdog timer expires.

Refreshing the watchdog timer may include signaling the watchdog timer to restart the watchdog timer's count. If the lease manager detects that a given computing node has lost communication with the cluster, the lease manager stops restarting the watchdog timer of the given computing node. Expiration of the watchdog timer triggers a reset of the given computing node.

The lease manager in the given computing node also maintains a representation of the node lease, such as by storing an information element in a memory of the given computing node. The information element set to a specified value indicates that the node lease is active on the given computing node.

The control system 108 and the other computing nodes of the cluster can check the node lease of the given computing node. If the control system 108 or the other computing nodes do not detect the node lease of the given computing node (e.g., the node lease cannot be accessed because the given computing node has lost connectivity to the cluster or has gone down or is being rebooted), then the control system 108 or the other computing nodes can determine that the given computing node is no longer available. The scheduler 110 in the control system 108 would not place any new DSP proxies on the given computing node, and further, the scheduler 110 can reschedule any DSP proxies on the given computing node on one or more other computing nodes of the cluster.

Although the example of FIG. 1 shows the presence of both the node problem detector and the lease manager in each computing node, in other examples, the lease manager may be omitted. In such other examples, the node problem detector would also check for connectivity of a given computing node to the cluster. So long as the node problem detector confirms that the given computing node has connectivity to the cluster, the node problem detector can send a heartbeat message or another indicator to the control system 108 and the other computing nodes. If the given computing node becomes unavailable (e.g., due to loss of connectivity to the cluster, the given computing node going down, or the given computing node rebooting), then the node problem detector will stop sending the heartbeat message or another indicator to the control system 108 and the other computing nodes. Failure to receive this heartbeat message or another indicator is an indication that the given computing node is not available.

Figure 2A:
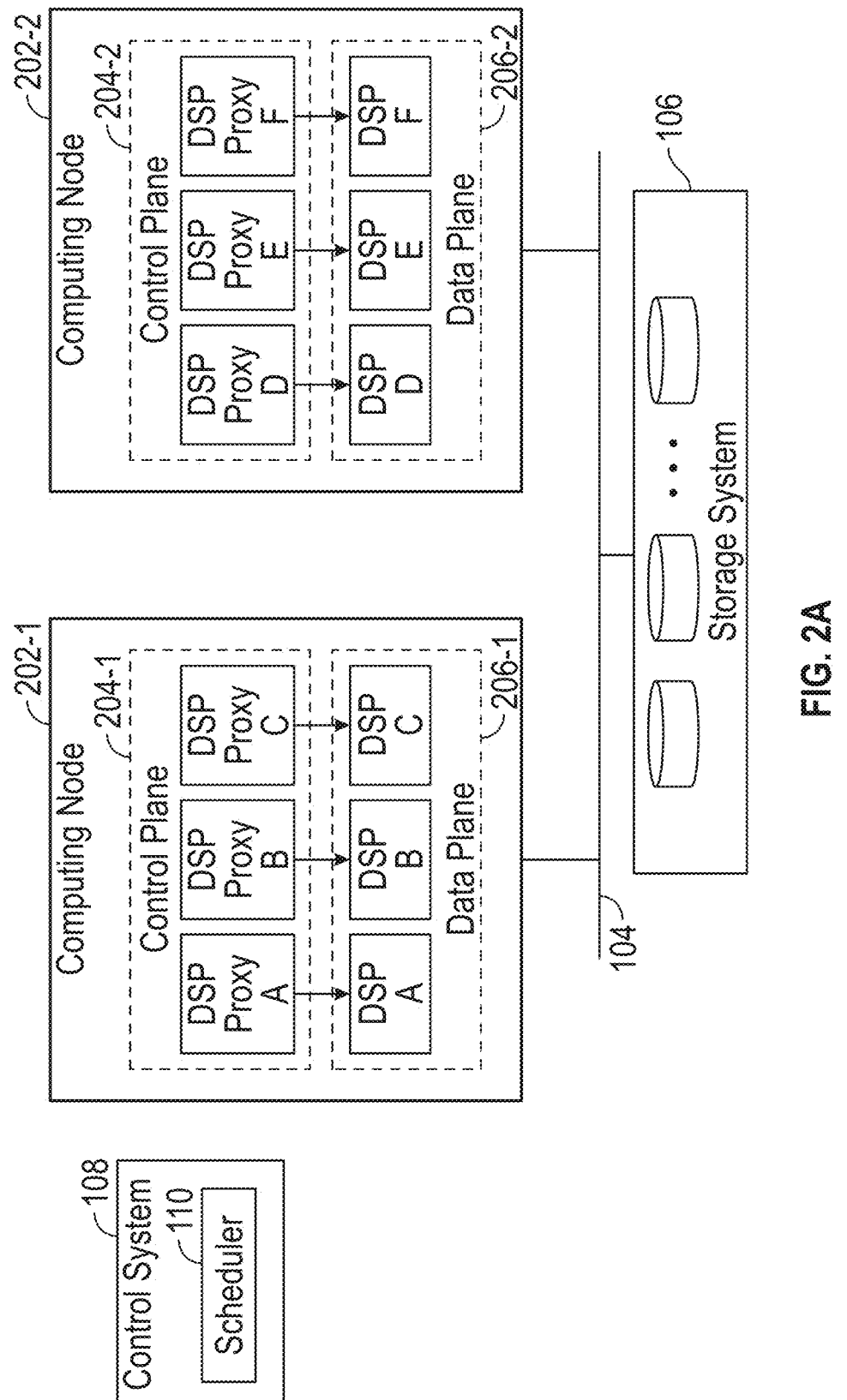
FIG. 2A and FIG. 2B are block diagrams of example arrangements including different quantities of computing nodes, according to some examples.

FIG. 2A shows an example arrangement including the control system 108 and two computing nodes 202-1 and 202-2 that are part of a cluster of computing nodes. The computing node 202-1 includes DSP proxy A, DSP proxy B, and DSP proxy C placed by the scheduler 110 in a control plane 204-1 of the computing node 202-1. DSP proxy A has activated DSP A, DSP proxy B has activated DSP B, and DSP proxy C has activated DSP C. DSP A, DSP B, and DSP C are part of a data plane 206-1 of the computing node 202-1.

Similarly, the computing node 202-2 includes DSP proxy D, DSP proxy E, and DSP proxy F placed by the scheduler 110 in a control plane 204-2 of the computing node 202-2. DSP proxy D has activated DSP D, DSP proxy E has activated DSP E, and DSP proxy F has activated DSP F. DSP D, DSP E, and DSP F are part of a data plane 206-2 of the computing node 202-2.

Figure 2B:
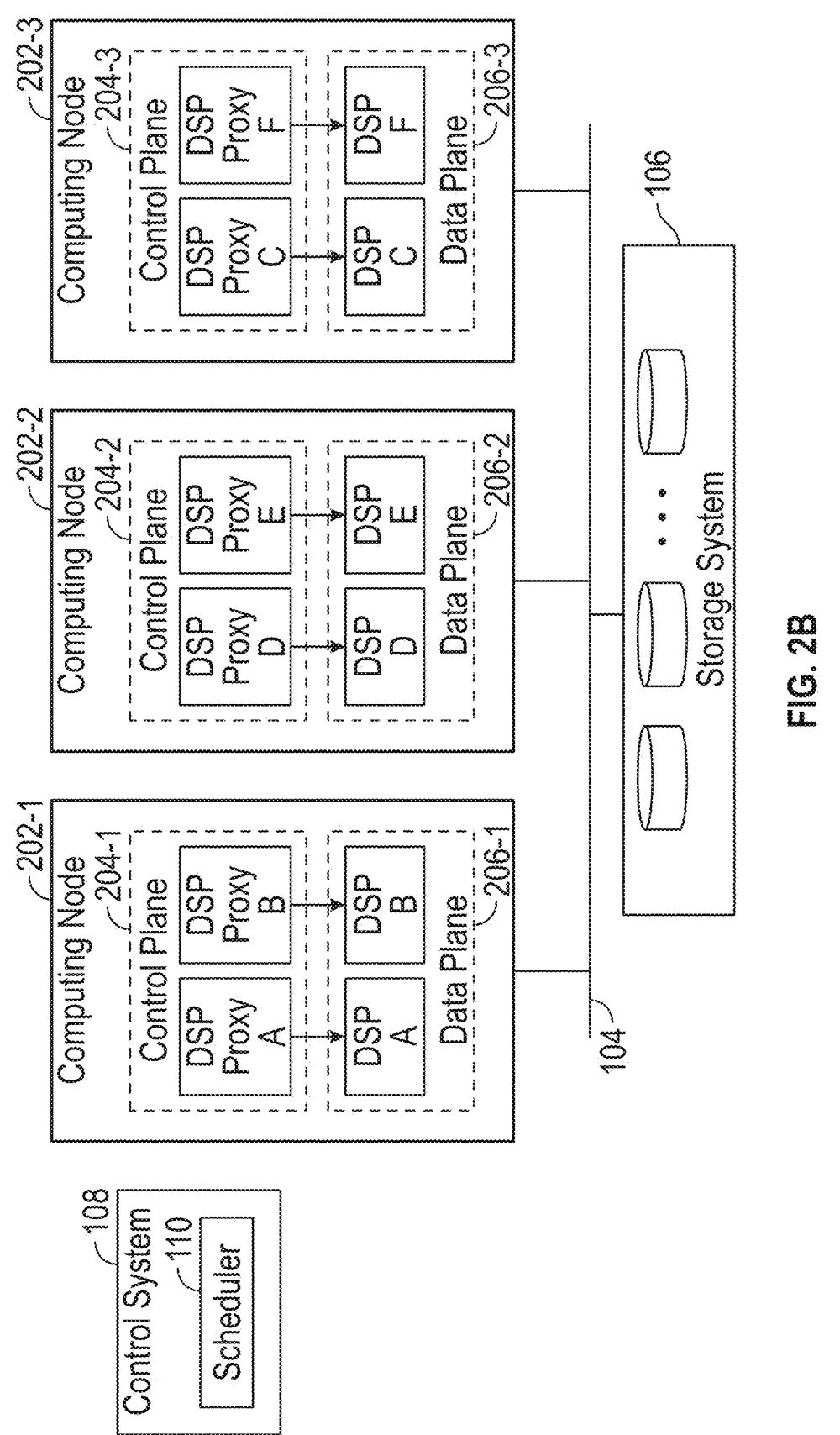

FIG. 2B shows an example in which another computing node 202-3 has been added to the cluster. Due to the addition of the computing node 202-3, the scheduler 110 detects a skew in the placement of the DSP proxies, due to each of the computing nodes 202-1 and 202-2 running three DSP proxies, and the added computing node 202-3 running no DSP proxies. This skew may violate a rule in the constraint information 120 (FIG. 1) specifying that DSPs are to be evenly distributed across computing nodes of the cluster. As a result, the scheduler 110 evicts DSP proxy C from the computing node 202-1, and evicts DSP proxy F from the computing node 202-2. The scheduler 110 places DSP proxy C and DSP proxy F in a control plane 204-3 of the added computing node 202-3.

DSP proxy C placed in the computing node 202-3 can retrieve information regarding where DSP C was last located. In some examples, SD processes in the computing nodes of the cluster can store information identifying the computing nodes that respective DSPs are running on in a shared memory, which can be retrieved by a DSP proxy placed in a new computing node by interacting with the SD process in the new computing node. Once DSP proxy C identifies that DSP C was last located in the computing node 202-1, DSP proxy C in the computing node 202-3 can issue a stop notification to the SD process in the computing node 202-1 to cause a termination of DSP C in the computing node 202-1. In response to receiving a confirmation (in the form of a notification from the SD process in the computing node 202-1) that DSP C has been terminated in the computing node 202-1, DSP proxy C in the computing node 202-3 starts DSP C in the computing node 202-3 by sending a start notification to the SD process in the computing node 202-3. DSP proxy F placed in the computing node 202-3 performs a similar process. Generally, a DSP proxy placed in a new computing node does not activate a DSP in the new computing node until the DSP proxy receives confirmation that the DSP in a prior computing node has been terminated.

In some examples where node leases are used, a DSP proxy placed on a new computing node also checks if the node lease of the prior computing node is active. If the node lease is not active (which indicates the prior computing node is unavailable), then the DSP proxy can skip sending the stop notification to the SD process of the prior computing node.

If a computing node (e.g., 202-1) were to be removed from the cluster in the arrangement of FIG. 2B, then the scheduler 110 evicts DSP proxies A and B from the computing node 202-1, and the scheduler 110 places DSP proxies A and B in the remaining computing nodes 202-2 and 202-3, respectively. DSP proxy A placed in the computing node 202-2 activates DSP A in the computing node 202-1, and DSP proxy B placed in the computing node 202-3 activates DSP A in the computing node 202-3.

A goal (referred to Goal A) of the scheduler 110 is to avoid activating multiple DSPs on multiple computing nodes for the same data shard (a split-brain condition) to avoid data corruption caused by multiple DSPs making inconsistent modifications of the data shard. In the above scenarios associated with adding a computing node to a cluster or removing a computing node from a cluster, during the process of evicting a DSP proxy from a source computing node and placing the DSP proxy on a target computing node, there may be multiple instances of the DSP proxy for a particular DSP (identified by a particular DSP identifier). To achieve Goal A, a lock can be used to prevent the multiple instances of the DSP proxy for the particular DSP identifier from being active at the same time. In examples where a Kubernetes cluster is used, the lock can include a variable included in the configuration data of a ConfigMap, which is an API object to store data as key-value pairs. In other examples, the lock can be implemented using any lock mechanism, such as a mutex or semaphore. The lock is used to arbitrate among multiple instances of the DSP proxy for the particular DSP identifier to allow just one of the multiple instances of the DSP proxy to proceed. The instance of the DSP proxy placed on the target computing node is allowed to acquire the lock (e.g., by creating a ConfigMap) in response to the lock being released by the instance of the DSP proxy in the source computing node (e.g., by deleting the ConfigMap).

Another goal (referred to as Goal B) is a liveness goal of DSPs to avoid any DSP from being unavailable, since the unavailable DSP would mean that data in the data shard associated with the unavailable DSP would not be accessible by clients. A DSP may be unavailable if a computing node goes down or is isolated (due to loss of connectivity to the cluster of computing nodes). In some examples, node problem detectors (e.g., 130-1 to 130-3 in FIG. 1) and/or lease managers (e.g., 140-1 to 140-3 in FIG. 1) allow unhealthy computing nodes or isolated computing nodes to be identified, so that DSP proxies on the unhealthy computing nodes or the isolated computing nodes may be evicted and placed on remaining computing nodes of the cluster.

In some examples, multiple computing nodes may become isolated, so that the cluster is divided into a first subset of computing nodes that are able to communicate with one another, and a second subset of computing nodes that are able to communicate with one another. However, computing nodes in the first subset are unable to communicate with computing nodes in the second subset. In such a scenario, the subset with the larger quantity of computing nodes is considered a majority subset, and the subset with the smaller quantity of computing nodes is considered a minority subset. The scheduler 110 causes eviction of DSP proxies in the minority subset of computing nodes, and the scheduler 110 places the evicted DSP proxies in the majority subset of computing nodes.

A further goal (referred to as Goal C) is that DSP failover time should be reduced when evicting a DSP proxy from an unavailable computing node (that has failed or has lost connectivity) and placing the DSP proxy in a target computing node. If the DSP failover time is too long, clients may timeout while waiting for requested data, which can degrade user experience or lead to errors. Goal C can be satisfied by tuning the scheduler 110 to start a new instance of the DSP proxy with minimal delay on the target computing node in response to detecting the unavailable computing node. The combination of using the lock (for Goal A) and the fact that the previous instance of the DSP proxy is on an unavailable computing node means that quickly starting the new instance of the DSP proxy in the target computing node is unlikely to lead to an error condition in which multiple DSP proxy instances are active at the same time.

A cluster of computing nodes that execute respective DSPs provides a disaggregated architecture for access of data shards of a data store. As cluster resources change (computing nodes are added or removed), the DSPs can scale accordingly. For example, DSPs can be migrated to different computing nodes. If new data shards are added, additional DSPs can be created. High availability is achieved by being able to detect unhealthy or isolated computing nodes, so that DSPs can be evicted from the unhealthy or isolated computing nodes, and placed on other computing nodes of the cluster. Indirect placement of DSPs by a scheduler in a control system based on placement of DSP proxies allows the scheduler to not have to be modified to support DSPs directly, which can reduce development time of the scheduler.

Figure 3:
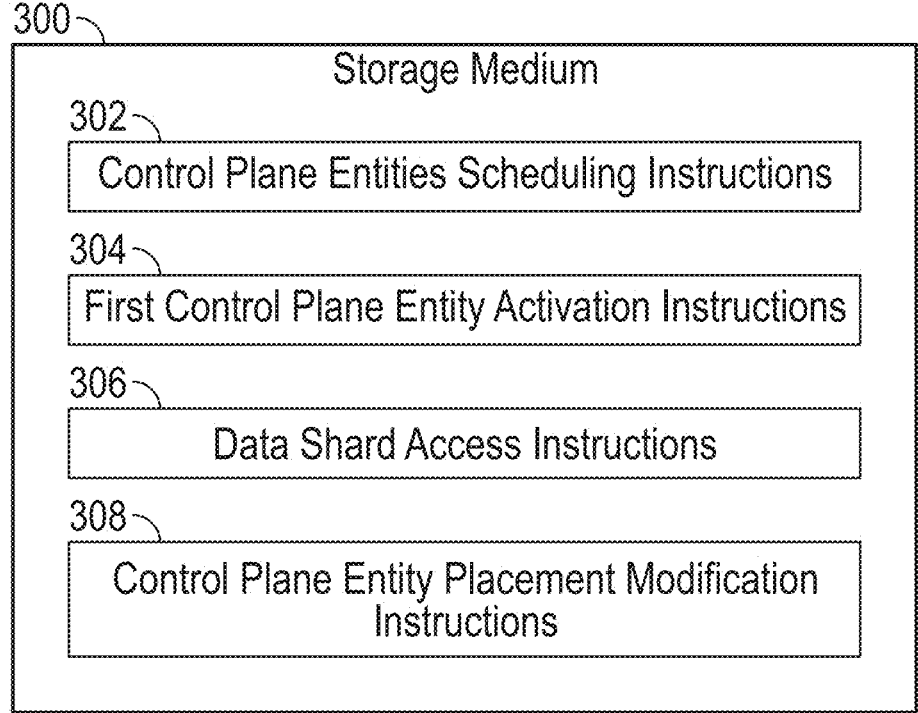
FIG. 3 is a block diagram of a storage medium storing machine-readable instructions according to some examples.

FIG. 3 is a block diagram of a non-transitory machine-readable or computer-readable storage medium 300 storing machine-readable instructions of a control plane of a cluster of computing nodes. For example, the machine-readable instructions of the control plane can be part of the control system 108 and in the computing nodes 102-1 to 102-3 of FIG. 1.

The machine-readable instructions include control plane entities scheduling instructions 302 to schedule, using a scheduler of the control plane, control plane entities in respective computing nodes of the cluster of computing nodes. The control plane entities include DSP proxies as shown in FIG. 1 and FIGS. 2A-2B. Placements of the control plane entities in the respective computing nodes reflect where respective data path service partitions are to be placed. Examples of the data path service partitions include the DSPs of FIG. 1 and FIGS. 2A-2B.

The machine-readable instructions include first control plane entity activation instructions 304 to activate, by a first control plane entity of the control plane entities in a first computing node of the cluster of computing nodes, a first data path service partition in the first computing node.

The machine-readable instructions include data shard access instructions 306 to access, using the first data path service partition in the first computing node, data of a first data shard in a data store, where data of the data store is partitioned across a plurality of data shards associated with the respective data path service partitions. The access of the first data shard usings modules and data structures of the first data path service partition.

The machine-readable instructions include control plane entity placement modification instructions 308 to, based on a condition of the cluster of computing nodes, modify a placement of a second control plane entity of the control plane entities to change a placement in the cluster of computing nodes of a second data path service partition associated with the second control plane entity. Note that the second control plane entity can be the same as or different from the first control plane entity, and the second data path service partition can be the same as or different from the first data path service partition.

In some examples, the data path service partitions include respective different slices of an I/O stack in a data path between the cluster of computing nodes and the data store.

In some examples, the first data path service partition includes elements selected from among: a caching module to manage caching of data, an index manager, a garbage collector, a buffer to store data, an index that maps objects to storage locations in the data store, or redundancy information relating to data redundancy in the data store.

In some examples, the modifying of the placement of the second control plane entity is part of a failover process (to failover from an unhealthy or isolated computing node) or a load balancing process (in response to detecting a skew in placement of control plane entities).

In some examples, the control plane entities include Kubernetes pods that are mapped to the respective data path service partitions.

In some examples, the first control plane entity activates the first data path service partition in the first computing node based on an interaction between the first control plane entity and a data plane process (e.g., an SD process) of the first computing node, where the first data path service partition includes elements that are part of a data plane.

In some examples, to modify the placement of the second control plane entity, the machine-readable instructions remove an existing instance of the second control plane entity from a given computing node of the cluster of computing nodes, and start a new instance of the second control plane entity in a further computing node of the cluster of computing nodes.

In some examples, the existing instance of the second control plane entity deactivates an existing instance of the second data path service partition in the given computing node, and the new instance of the second control plane entity activates a new instance of the second data path service partition in the further computing node.

In some examples, during the modification of the placement of the second control plane entity, the existing instance of the second control plane entity and the new instance of the second control plane entity are present concurrently, and wherein the machine-readable instructions can arbitrate, using a lock, among the existing instance of the second control plane entity and the new instance of the second control plane entity to allow just one of the existing instance of the second control plane entity and the new instance of the second control plane entity to proceed.

In some examples, the first control plane entity can self-terminate in the first computing node responsive to an error condition in the first computing node. As part of the self-termination, the first control plane entity deactivates the first data path service partition in the first computing node.

In some examples, the scheduling of the control plane entities in the respective computing nodes is performed during a setup of the cluster of computing nodes or a modification of the cluster of computing nodes (due to an addition of a new computing node or the removal of an existing computing node).

In some examples, agents in the respective computing nodes can monitor a health of the respective computing nodes. An "agent" can be a node problem detector and/or a lease manager as shown in FIG. 1. Based on a first agent detecting that the first computing node is unhealthy, a health indicator is provided that indicates that the first computing node is unhealthy. For example, the health indicator can include a notification from a node problem detector. As another example, the health indicator can include a node lease (lack of the node lease indicates that the respective computing node has been isolated from the cluster). In response to the health indicator indicating that the first computing node is unhealthy, a process is initiated to disable the first computing node and evict any control plane entities from the first computing node. For example, the first computing node can be disabled by no longer refreshing a watchdog timer in the first computing node. In another example, the first computing node can be disabled by no longer placing control plane entities and respective data path service partitions on the first computing node. In response to the health indicator indicating that the first computing node is unhealthy, the machine-readable instructions change a placement of the first control plane entity to another computing node of the cluster of computing nodes.

In some examples, based on the monitoring by the agents, the machine-readable instructions can detect that a first subset of computing nodes of the cluster of computing nodes is isolated from a second subset of computing nodes of the cluster of computing nodes. The machine-readable instructions can compare a first quantity of computing nodes in the first subset of computing nodes to a second quantity of computing nodes in the second subset of computing nodes. Based on the first quantity being greater than the second quantity, the machine-readable instructions can disable the second subset of computing nodes.

In some examples, the machine-readable instructions can select which computing nodes of the cluster of computing nodes to schedule the control plane entities based on health indicators from the agents.

Figure 4:
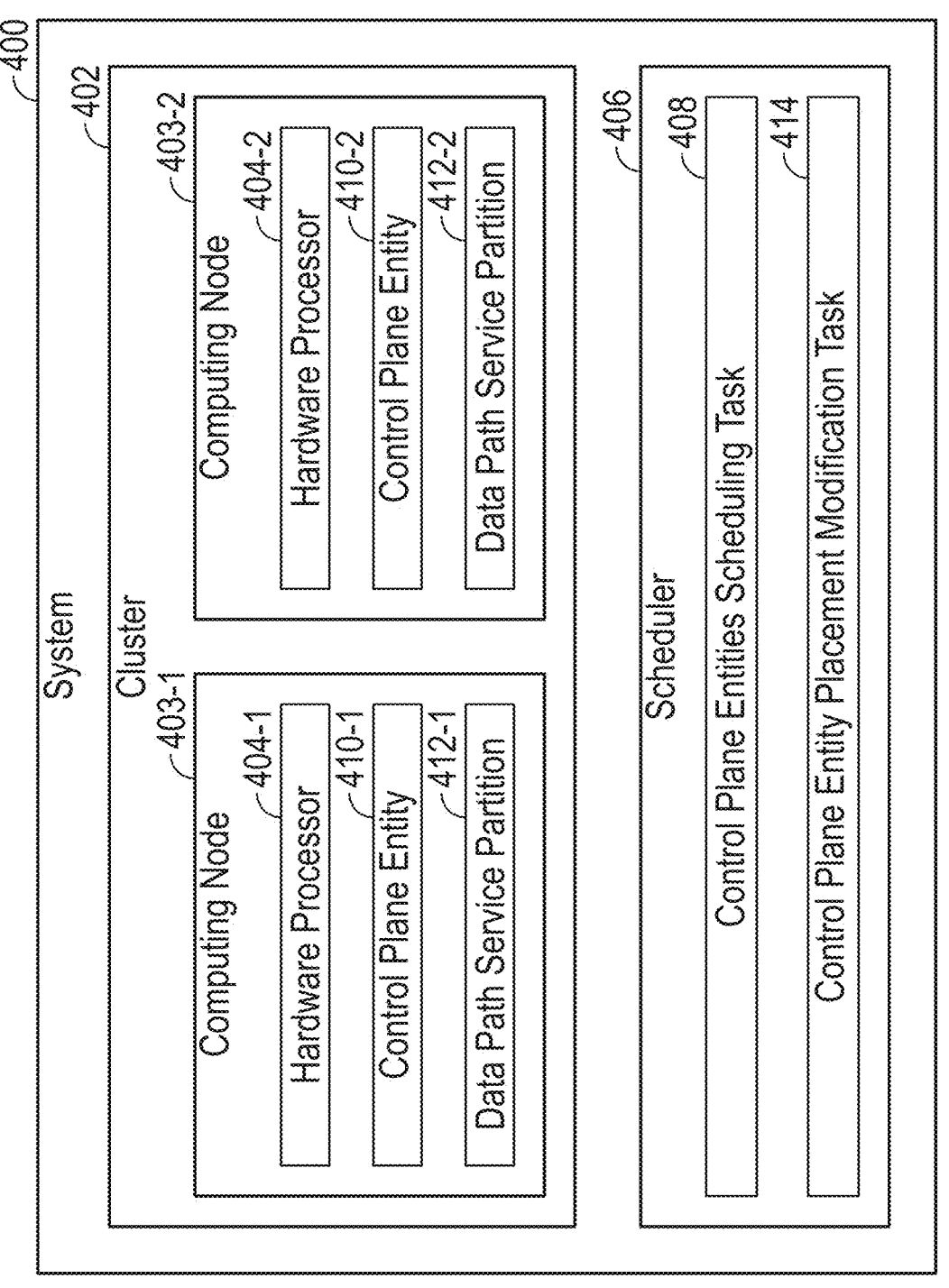
FIG. 4 is a block diagram of a system according to some examples.

FIG. 4 is a block diagram of a system 400 according to some examples. The system 400 includes a cluster 402 of computing nodes 403-1 and 403-2 that include hardware processors 404-1 and 404-2. A hardware processor can include a microprocessor, a core of a multi-core microprocessor, a microcontroller, a programmable integrated circuit, a programmable gate array, or another hardware processing circuit.

The system 400 includes a scheduler 406, which may execute in a control system to perform various tasks. The tasks of the scheduler 406 include a control plane entities scheduling task 408 to schedule control plane entities 410-1 and 410-2 in respective computing nodes of the cluster 402. The control plane entities are proxies for respective data path service partitions 412-1 and 412-2 in the respective computing nodes.

The tasks of the scheduler 406 include a control plane entity placement modification task 414 to, based on a condition of the cluster 402, modify a placement of the first control plane entity 410-1 to change a placement in the cluster 402 of computing nodes of the first data path service partition 412-1 associated with the first control plane entity 410-1.

The first control plane entity 410-1 activates the data path service partition 412-1 in the first computing node 403-1. The first data path service partition 412-1 in the first computing node 403-1 accesses data of a first data shard in a data store, where data of the data store is partitioned across a plurality of data shards associated with the respective data path service partitions.

FIG. 5 is a flow diagram of a process 500, which may be performed by a control system (e.g., 108 in FIG. 1) and computing nodes (e.g., 102-1 to 102-3 in FIG. 1).

The process 500 includes scheduling (at 502), using a scheduler of a control plane, control plane entities in respective computing nodes of the cluster of computing nodes, where the control plane entities are part of the control plane, and placements of the control plane entities in the respective computing nodes reflect where respective data path service partitions are to be placed, the respective data path service partitions being part of a data plane to access corresponding data shards in a data store.

The process 500 includes activating (at 504), by a first control plane entity of the control plane entities in a first computing node of the cluster of computing nodes, a first data path service partition in the first computing node. The activation can include sending a start notification to an SD process in the first computing node, for example.

The process 500 includes accessing (at 506), using the first data path service partition in the first computing node, data of a first data shard in the data store, where data of the data store is partitioned across a plurality of data shards associated with the respective data path service partitions.

The process 500 includes modifying (at 508), based on a changed condition of the cluster of computing nodes, a placement of the first control plane entity to evict the first control plane entity from the first computing node and place the first control plane entity in a second computing node of the cluster of computing nodes.

In some examples, each computing node of the cluster of computing nodes includes an SD process that a control plane entity interacts with to activate or deactivate a respective data path service partition. The process 500 further includes after placing the first control plane entity in the second computing node, determining, by the first control plane entity in the second computing node, that an existing instance of the first data path service partition is in the first computing node. The first control plane entity in the second computing node sends a stop notification to the SD process in the first computing node to terminate the existing instance of the first data path service partition. Based on receiving a confirmation that the existing instance of the first data path service partition has been terminated, the first control plane entity in the second computing node activates, by sending a start notification to the SD process in the second computing node, a new instance of the first data path service partition in the second computing node.

As used here, a "memory" can be implemented with one or more memory devices. A memory device can include any or some combination of the following: a dynamic random access memory (DRAM) device, a static random access memory (SRAM) device, an erasable and programmable read-only memory (EPROM) device, an electrically erasable and programmable read-only memory (EEPROM) device, a flash memory device, or any other type of memory device.

A "processing resource" can include one or more hardware processors.

Machine-readable instructions executable on a hardware processor can refer to the instructions executable on a single hardware processor or the instructions executable on multiple hardware processors.

A storage medium (e.g., 300 in FIG. 3) can include any or some combination of the following: a semiconductor memory device such as a DRAM or SRAM, an EPROM, an EEPROM, or flash memory; a magnetic disk such as a fixed, floppy and removable disk; another magnetic medium including tape; an optical medium such as a compact disk (CD) or a digital video disk (DVD); or another type of storage device. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the present disclosure, use of the term "a," "an," or "the" is intended to include the plural forms as well, unless the context clearly indicates otherwise. Also, the term "includes," "including," "comprises," "comprising," "have," or "having" when used in this disclosure specifies the presence of the stated elements, but do not preclude the presence or addition of other elements.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

14

What is claimed is:

1. A non-transitory machine-readable storage medium comprising instructions of a control plane of a cluster of computing nodes, the instructions upon execution causing a system to:

schedule, using a scheduler of the control plane, control plane entities in respective computing nodes of the cluster of computing nodes, wherein placements of the control plane entities in the respective computing nodes reflect where respective data path service partitions are to be placed;

activate, by a first control plane entity of the control plane entities in a first computing node of the cluster of computing nodes, a first data path service partition in the first computing node;

access, using the first data path service partition in the first computing node, data of a first data shard in a data store, wherein data of the data store is partitioned across a plurality of data shards associated with the respective data path service partitions; and based on a condition of the cluster of computing nodes, modify a placement of a second control plane entity of the control plane entities to change a placement in the cluster of computing nodes of a second data path service partition associated with the second control plane entity.

2. The non-transitory machine-readable storage medium of claim 1, wherein the data path service partitions comprise respective different slices of an input/output (I/O) stack in a data path between the cluster of computing nodes and the data store.

3. The non-transitory machine-readable storage medium of claim 2, wherein the first data path service partition comprises elements selected from among: a caching module to manage caching of data, an index manager, a garbage collector, a buffer to store data, an index that maps objects to storage locations in the data store, or redundancy information relating to data redundancy in the data store.

4. The non-transitory machine-readable storage medium of claim 1, wherein the modifying of the placement of the second control plane entity is part of a failover process or a load balancing process.

5. The non-transitory machine-readable storage medium of claim 1, wherein the control plane entities comprise Kubernetes pods that are mapped to the respective data path service partitions.

6. The non-transitory machine-readable storage medium of claim 1, wherein the first control plane entity activates the first data path service partition in the first computing node based on an interaction between the first control plane entity and a data plane process of the first computing node, wherein the first data path service partition comprises elements that are part of a data plane.

7. The non-transitory machine-readable storage medium of claim 1, wherein the instructions upon execution cause the system to:

to modify the placement of the second control plane entity, remove an existing instance of the second control plane entity from a given computing node of the cluster of computing nodes, and start a new instance of the second control plane entity in a further computing node of the cluster of computing nodes.

8. The non-transitory machine-readable storage medium of claim 7, wherein the instructions upon execution cause the system to:

deactivate, by the existing instance of the second control plane entity, an existing instance of the second data path service partition in the given computing node; and activate, by the new instance of the second control plane entity, a new instance of the second data path service partition in the further computing node.

9. The non-transitory machine-readable storage medium of claim 7, wherein during the modification of the placement of the second control plane entity, the existing instance of the second control plane entity and the new instance of the second control plane entity are present concurrently, and wherein the instructions upon execution cause the system to:

arbitrate, using a lock, among the existing instance of the second control plane entity and the new instance of the second control plane entity to allow just one of the existing instance of the second control plane entity and the new instance of the second control plane entity to proceed.

10. The non-transitory machine-readable storage medium of claim 1, wherein the instructions upon execution cause the system to:

self-terminate the first control plane entity in the first computing node responsive to an error condition in the first computing node, wherein as part of the self-termination the first control plane entity deactivates the first data path service partition in the first computing node.

11. The non-transitory machine-readable storage medium of claim 1, wherein the scheduling of the control plane entities in the respective computing nodes is performed during a setup of the cluster of computing nodes or a modification of the cluster of computing nodes.

12. The non-transitory machine-readable storage medium of claim 1, wherein the instructions upon execution cause the system to:

monitor, by agents in the respective computing nodes, a health of the respective computing nodes;

based on a first agent detecting that the first computing node is unhealthy, provide a health indicator indicating that the first computing node is unhealthy, and initiate a process to disable the first computing node; and in response to the health indicator indicating that the first computing node is unhealthy, change a placement of the first control plane entity to another computing node of the cluster of computing nodes.

13. The non-transitory machine-readable storage medium of claim 12, wherein the instructions upon execution cause the system to:

based on the monitoring by the agents, detect that a first subset of computing nodes of the cluster of computing nodes is isolated from a second subset of computing nodes of the cluster of computing nodes;

compare a first quantity of computing nodes in the first subset of computing nodes to a second quantity of computing nodes in the second subset of computing nodes; and based on the first quantity being greater than the second quantity, disable the second subset of computing nodes.

14. The non-transitory machine-readable storage medium of claim 12, wherein the instructions upon execution cause the system to:

select which computing nodes of the cluster of computing nodes to schedule the control plane entities based on health indicators from the agents.

15. A system comprising:

a cluster of computing nodes comprising hardware processors; and a scheduler to:

schedule control plane entities in respective computing nodes of the cluster of computing nodes, wherein the control plane entities are proxies for respective data path service partitions in the respective computing nodes, and based on a condition of the cluster of computing nodes, modify a placement of a first control plane entity of the control plane entities to change a placement in the cluster of computing nodes of a first data path service partition associated with the first control plane entity;

the first control plane entity to activate, in a first computing node of the cluster of computing nodes, the first data path service partition in the first computing node; and the first data path service partition in the first computing node to access data of a first data shard in a data store, wherein data of the data store is partitioned across a plurality of data shards associated with the respective data path service partitions.

16. The system of claim 15, wherein a computing node of the cluster of computing nodes comprises a node problem detector to:

detect that the computing node is unhealthy, and send a notification to a control system indicating that the computing node is unhealthy, wherein the control system comprises the scheduler, and the condition of the cluster of computing nodes triggering the modifying of the placement of the first control plane entity comprises the computing node being unhealthy.

17. The system of claim 15, wherein the first control plane entity is part of a control plane of the first computing node, and the first data path service partition is part of a data plane of the first computing node.

18. The system of claim 15, wherein the first control plane entity when placed in the first computing node is to:

identify a second computing node where an existing instance of the first data path service partition is located, send a stop notification to the second computing node to terminate the existing instance of the first data path service partition in the second computing node, and in response to receiving a confirmation that the existing instance of the first data path service partition has been terminated in the second computing node, activate a new instance of the first data path service partition in the first computing node.

19. A method comprising:

scheduling, using a scheduler of a control plane, control plane entities in respective computing nodes of a cluster of computing nodes, wherein the control plane entities are part of the control plane, and placements of the control plane entities in the respective computing nodes reflect where respective data path service partitions are to be placed, the respective data path service partitions being part of a data plane to access corresponding data shards in a data store;

activating, by a first control plane entity of the control plane entities in a first computing node of the cluster of computing nodes, a first data path service partition in the first computing node;

accessing, using the first data path service partition in the first computing node, data of a first data shard in the data store, wherein data of the data store is partitioned across a plurality of data shards associated with the respective data path service partitions; and based on a changed condition of the cluster of computing nodes, modifying a placement of the first control plane entity to evict the first control plane entity from the first computing node and place the first control plane entity in a second computing node of the cluster of computing nodes.

20. The method of claim 19, wherein each computing node of the cluster of computing nodes comprises a services daemon process that a control plane entity interacts with to activate or deactivate a respective data path service partition, the method comprising:

after placing the first control plane entity in the second computing node:

determining, by the first control plane entity in the second computing node, that an existing instance of the first data path service partition is in the first computing node, sending, by the first control plane entity in the second computing node, a stop notification to the services daemon process in the first computing node to terminate the existing instance of the first data path service partition, based on receiving a confirmation that the existing instance of the first data path service partition has been terminated, activating, by the first control plane entity in the second computing node by sending a start notification to the services daemon process in the second computing node, a new instance of the first data path service partition in the second computing node.

* * * * *